United States Patent [19]

Campbell et al.

[11] 3,980,621

[45] Sept. 14, 1976

[54] POLYAMIDES OF TEREPHTHALIC ACID AND 5-METHYL-1,9-NONANEDIAMINE AND FIBERS THEREOF

[75] Inventors: Robert W. Campbell; Harold Wayne Hill, Jr., both of Bartlesville, Okla.

[73] Assignee: Phillips Petroleum Company, Bartlesville, Okla.

[22] Filed: Mar. 13, 1972

[21] Appl. No.: 234,031

[52] U.S. Cl. .................... 260/78 R; 260/33.4 R; 260/78 S
[51] Int. Cl.² ......................................... C08G 69/26
[58] Field of Search .............................. 260/78 R

[56] References Cited
UNITED STATES PATENTS

| | | | |
|---|---|---|---|
| 2,752,328 | 6/1956 | Magat | 260/78 R |
| 3,198,771 | 8/1965 | Gabler | 260/78 R |
| 3,563,959 | 2/1971 | Schade et al. | 260/78 R |

Primary Examiner—Harold D. Anderson

[57] ABSTRACT

A new polyamide composed at least primarily of terephthalic acid and 5-methyl-1,9-nonanediamine, the polyamide having less than 5 olefinic double bonds per 100 diamine units, an inherent viscosity of at least about 0.6, a polymer melt temperature of at least about 200°C, a $T_g$ in the range of about 100°C to about 120°C, and a $T_m$ in the range of about 247°C to about 265°C can be formed into fibers without the use of plasticizers. Such fibers can be produced with a boiling water shrinkage of less than 30 percent and a zero strength temperature of at least 200°C.

27 Claims, 6 Drawing Figures

POLYAMIDES OF TEREPHTHALIC ACID AND 5-METHYL-1,9-NONANEDIAMINE AND FIBERS THEREOF

This invention relates to novel polyamides and to fibers prepared from such polyamides.

U.S. Pat. No. 2,752,328 discloses a linear terephthalamide polymer prepared with 5-methyl-1,9-nonanediamine. However, the patentee states that this polyamide has zero strength temperatures which are undesirably low for most textile uses, and that it is exceedingly water-sensitive and shrinks excessively in hot water. The only 5-methyl-1,9-nonanediamine terephthalate polyamide for which actual data are given in the patent is described in Example 11 and Table I as having a boiling water shrinkage of 78 percent, a zero strength temperature of 160°C, and a tenacity of 1.9 grams/-denier. The patentee further states that in order to obtain satisfactory linear terephthalamide polymers it is critical that the diaminoalkane utilized must have a methyl-substituted hydrocarbon chain of 6 to 8 carbon atoms in length with the total number of carbon atoms in the diaminoalkane not exceeding the value obtained by subtracting the number of methyl groups from 10. The patentee also states that it was desirable, if not essential, to have a plasticizer for the polymer present during the polycondensation reaction and even during spinning for some of the polymers. The patentee apparently utilized 50 parts of o-hydroxydiphenyl per 110 parts of the salt as a plasticizer during the polycondensation reaction for the terephthalamide polymer of 5-methyl-1,9-nonanediamine.

Contrary to the teachings of the prior art, we have now discovered a linear terephthalamide polymer prepared with 5-methyl-1,9-nonanediamine having desirable values of boiling water shrinkage, zero strength temperature, and tenacity. Linear as used herein is meant to refer to polymer which is fusible and soluble in common solvents for polyamides, e.g., m-cresol, formic acid, etc.

Accordingly, it is an object of the present invention to provide a new and improved polymer of 5-methyl-1,9-nonanediamine terephthalate. Another object of the invention is to provide a fiber from a polymer of 5-methyl-1,9-nonanediamine terephthalate having commercially acceptable values of boiling water shrinkage, zero strength temperature, and tenacity. A further object of the invention is to provide a new and commercially useful liner polyamide fiber. Yet another object of the invention is to provide a new linear polyamide useful for molding. Other objects, aspects and advantages of the invention will be apparent from a study of the specification, the drawings and the appended claims to the invention.

In the drawings

FIGS. 3 and 4 are reproductions of NMR spectra for a representative polymer of the present invention, while

The polymers of the present invention are linear terephthalamide polymers composed at least primarily of recurring structural units of the formula wherein R is selected from the group consisting essentially of 5-methylnonamethylene, 2,4-dimethyloctamethylene, and 2,4,6-trimethylheptamethylene, with at least 50 percent, more preferably at least 70 percent, and more preferably at least 80 percent of the R's being 5-methylnonamethylene. Polymers consisting of recurring units derived from pure 5-methyl-1,9-nonanediamine terephthalate have been found to have useful properties. Although it is within the contemplation of the invention for the polymer to contain up to 20 weight percent of other recurring structural units, the polymer will generally have at least 90 weight percent, preferably at least 95 weight percent, and more preferably at least 98 weight percent, of its recurring structural units in the form of the $C_{10}$ diamine terephthalamide defined by formula I. Linear polymers consisting essentially of the $C_{10}$ diamine terephthalamide defined by formula I as the sole recurring unit have been found to be particularly useful. When other recurring units are present in the polymer as a result of monomeric impurities being present in the preparation of the salt, such other recurring units will generally have the formula wherein each R' is independently selected from the group consisting of hydrogen and alkyl radicals having from 1 to 4 carbon atoms per radical, $R^2$ is a divalent hydrocarbon radical having from 6 to 16 carbon atoms, and $R^3$ is a divalent hydrocarbon radical having from 4 to 14 carbon atoms. For example, in the preparation of the saturated $C_{10}$ diamines having from 7 to 9 carbon atoms in the chain by the reaction of acrylonitrile and isobutylene and the subsequent hydrogenation of the reaction product, incomplete hydrogenation will permit the diamine product to contain olefinic materials such as 5-methyl-4-nonenediamine, 2,4-dimethyl-4-octenediamine, 2,4-dimethyl-3-octenediamine, and 2,4,6-trimethyl-3-heptenediamine. Such olefinic materials being present during the polycondensation reaction results in a polyamide having olefinic double bonds. It is a feature of the present invention that the presence of such olefinic double bonds in the polyamide is minimized, at least to the extent of having less than 5 olefinic double bonds per 100 R groups in the polyamide. In preferred embodiments of the invention, the polyamide will contain less than about 1 olefinic double bond per 100 R groups and more preferably less than about 1 olefinic double bond per 1000 R groups. Also the utilization of solvents such as methanol and ethanol with some reduction catalysts appears to result in N-alkylated $C_{10}$ diamines.

The recurring units of formula II can also be present as a result of deliberate addition of other diamines, dicarboxylic acids, or salts for the purpose of producing a copolymer. Thus diamines such as hexamethylenediamine, octamethylenediamine, nonamethylenediamine, decamethylenediamine, hexadecamethylenediamine, 1,4-cyclohexanediamine, 1,4-bis(aminomethyl)cyclohexane, bis(4-aminocyclohexyl)methane, or alkyl substituted versions thereof can be employed along with various dicarboxylic acids such as adipic acid, suberic acid, azelaic acid, sebacic acid, dodecanedioic acid, hexadecanedioic acid, 1,4-cyclohexanedicarboxylic acid, or 1,1,3-trimethyl-5-carboxy-3-(p-carboxyphenyl)indane. In lieu of, or in addition to, polymer units as represented in formula II, recurring units such as those obtained by polymerization of amino acids and/or lactams can be present. The end groups on the polymer can be varied as desired by employing various amounts of excess acid or excess diamine, or by adding known additives such as monofunctional acids.

The presently preferred polyamides of terephthalic acid and either 5-methyl-1,9-nonanediamine or an admixture of 5-methyl-1,9-nonanediamine, 2,4-dimethyl-1,8-octanediamine and 2,4,6-trimethyl-1,7-heptanediamine have an inherent viscosity (as measured at 30°C in a m-cresol solution having a polymer concentration of 0.5 gram/100 milliliters solution) of at least 0.6, more preferably at least 0.65 and for fiber applications most preferably in the range of about 0.7 to about 1.2. These presently preferred polyamides will also generally have a polymer melt temperature of at least about 220°C, preferably in the range of about 225°C to about 260°C, a $T_g$ of at least 100°C, preferably in the range of about 100°C to about 120°C and more preferably in the range of about 105°C to about 115°C, a $T_m$ of at least 247°C, preferably in the range of about 247°C to about 265°C and more preferably in the range of about 250°C to about 260°C. These polyamides have been found to have infrared absorption bands near 3300, 3080, 2930, 2880, 1630, 1550, 1500, 1300, 1020, 870, and 740 cm$^{-1}$. The polymers can be produced in the absence of any plasticizers, and as employed for fibers, will generally have less than 2 weight percent, preferably less than 0.5 weight percent, based on the weight of the fiber, of any plasticizers for the polymer. Such polymers which are at least essentially free of any plasticizers for the polymer have been found to be particularly useful for fibers as the presence of plasticizers generally lowers $T_g$, reduces crystallinity, and increases the boiling water shrinkage of the fiber. However, if desired, a plasticizer can be incorporated into the polymer and/or fiber by suitable techniques.

These polyamides can be prepared by first forming and optionally recovering the salt, followed by charging the salt to a polycondensation reactor, or the diamine and terephthalic acid can be charged directly to the polycondensation reactor and the salt formed in situ. It is presently preferred to obtain the highly saturated diamines from the hydrogenation of the corresponding unsaturated dinitriles under conditions resulting in the desired level of saturation of the diamine product, thereby minimizing the expense of extensive separation techniques. Production of the polyamides preferably is conducted in a polymerization process in which the temperature is maintained at or below about 300°C.

The polyamides of the invention can be employed as molding resins, but have been found to be of particular interest in the formation of fibers. Utilizing these polyamides, fibers having a boiling water shrinkage of less than 30 percent and a zero strength temperature of at least 200°C are readily produced. The presently preferred fiber of these polyamides have a boiling water shrinkage of less than 20 percent, a zero strength temperature of at least 210°C, more preferably at least 215°C, and a tenacity of at least 2 grams per denier, and more preferably at least 3.5 grams per denier. The fibers are preferably drawn to a length at least 3 times, and more preferably at least 3.5 times, the original quenched length, to achieve desirable characteristics. If desired, the drawn fiber can be annealed to further reduce the boiling water shrinkage.

The following examples are presented in further illustration of the invention, but should not be construed in undue limitation thereof.

EXAMPLE I

The mixture of diamines used in the preparation of the polymers in Examples II–VI were produced as follows: Acrylonitrile, inhibited with 0.1 weight percent hydroquinone, was reacted with Phillips Pure Grade isobutylene and the reaction effluent was then distilled to produce a monoadduct comprising 5-methyl-5-hexenenitrile and 2,4-dimethyl-4-pentenenitrile in a weight ratio of about 16 to 1. monoadduct monadduct was reacted with additional acrylonitrile and isobutylene to produce a diadduct comprising 5-methylenenonanedinitrile and 5-methyl-4-nonenedinitrile as the major components (combined weight percent of about 88.9), 2-methyl-4-methyleneoctanedinitrile, 2,4-dimethyl-4-octenedinitrile, and 2,4-dimethyl-3-octenedinitrile as minor components (combined weight percent of about 9.9), and small amounts of 2-methylene-4,6-dimethylheptanedinitrile and 2,4,6-trimethyl-2-heptenedinitrile (combined weight percent of about 1.2). The weight ratio of 5-methylenenonanedinitrile to 5-methyl-4-nonenedinitrile was approximately 3:2, as determined by nuclear magnetic resonance.

The diadduct was hydrogenated in two sequential stages. In the first stage, the diadduct was reduced to the corresponding, chiefly unsaturated diamines in a 5-gallon autoclave in three separate charges of 1430, 1390, and 1250 grams, respectively. Each charge also contained about 5.7 liters of methanol solvent, 2700–3000 grams of ammonia, and 6 teaspoons of Raney nickel catalyst. Reaction conditions included a temperature in the range of 130°–135°C, a reaction time of 3 hours, and maximum hydrogen pressures of about 1500 psig. After removing ammonia, the effluent solutions from these runs were filtered to remove catalyst. The solutions were then concentrated to about 25 percent of the original volume by distilling off methanol. These solutions of primarily unsaturated diamines were combined and used in the second stage for the hydrogenation of the unsaturated diamines to saturated diamines. This reaction was also conducted in a 5-gallon autoclave. Two runs were made, with the charge for each run being about one-half of the primarily unsaturated diamine, solution, additional methanol to make 9.5 liters of total solution, and 30 grams of ruthenium dioxide.

Reaction conditions included a temperature in the range of 150°–158°C, a reaction time of 2.25 hours, and maximum hydrogen pressure of 1620 psig. After removal of ammonia and filtering to remove solids, the solutions from the two runs were combined, the methanol was removed by distillation, and the diamine product was fractionated as described below, by distillation using a 15-plate Oldershaw column. The yield of distilled diamines, based on diadduct charged, was 73.1 mole percent.

The fractionation data and analyses of individual fractions are given in Table I:

TABLE I

| Fraction | Head Temp., °C | Pressure, mm Hg | Wt. grams | GLC Analysis, wt. %[a] | | | |
|---|---|---|---|---|---|---|---|
| | | | | A | B | C | D |
| 1 | Up to 120 | 17 | 17 | | | | |
| 2 | 120–140 | 17 | 21 | | | | |
| 3 | 140 | 17 | 25.5 | 1.2 | 37.4 | | 59.9 |
| 4 | 140 | 17 | 38.5 | 1.0 | 38.3 | | 60.7 |
| 5 | 140 | 17 | 34.5 | 0.9 | 38.6 | | 60.5 |
| 6 | 140–141 | 17 | 45.5 | 0.6 | 37.2 | | 62.2 |
| 7 | 141–142 | 17 | 66.3 | 0.7 | 35.7 | | 63.6 |
| 8 | 142 | 17 | 68.7 | 0.6 | 33.6 | | 65.8 |
| 9 | 142 | 17 | 181 | 0.5 | 31.8 | 0.5 | 67.0 |
| 10 | 141 | 17 | 189.5 | 0.2 | 25.0 | 0.9 | 73.9 |
| 11[b] | 144 | 17 | 54.3 | 0.2 | 23.3 | 1.0 | 75.5 |
| 12 | Up to 140 | 17 | 178.3 | | 20.9 | 0.7 | 78.5 |
| 13 | 140–141 | 17 | 240.7 | | 14.4 | 0.9 | 84.6 |
| 14 | 141 | 17 | 160.5 | | 10.2 | 0.6 | 89.4 |
| 15 | 141 | 17 | 119.5 | | 8.9 | 0.9 | 90.4 |
| 16 | 141 | 17 | 80.2 | | 5.0 | 0.9 | 94.2 |
| 17 | 141–137 | 17–16 | 119.7 | | 6.8 | 1.0 | 92.4 |
| 18 | 137 | 16 | 221.4 | | 5.5 | 0.9 | 93.5 |
| 19[b] | 137–133 | 16–15 | 28.7 | | 4.7 | 0.9 | 94.5 |
| 20 | Up to 135 | 15 | 54.8 | | 2.3 | 0.9 | 96.8 |
| 21 | 135 | 15 | 265.6 | | 1.4 | 1.4 | 96.8 |
| 22 | 135 | 15 | 323 | | 1.5 | 1.5 | 97.2 |
| 23 | 135–115 | 15–5 | 312 | | 1.0 | 2.1 | 97.1 |
| 24 | 115–105 | 5–1 | 352 | | 0.6 | 3.0 | 96.6 |
| Residue | — | — | 874.3 | | | | |

[a]A is 2,4,6-trimethyl-1,7-heptanediamine; B is 2,4-dimethyl-1,8-octanediamine; C is a mixture of N-methylated C$_{10}$ diamines; D is 5-methyl-1,9-nonanediamine.
[b]Distillation interrupted to transfer to smaller kettle.

From the analyses of the individual fractions, the calculated composition, by weight, of combined fractions 3 through 24 was:

| | |
|---|---|
| 2,4,6-trimethyl-1,7-heptanediamine | 0.1% |
| 2,4-dimethyl-1,8-octanediamine | 11.3% |
| 5-methyl-1,9-nonanediamine | 87.3% |
| N-methylated C$_{10}$ diamines with N,5-dimethyl-1,9-nonanediamine being predominant | 1.2% |

The diamine samples used in Examples III–VI were obtained by blending individual fractions and portions of individual fractions. The fractions blended and the calculated composition for each sample are listed below, the expression MND referring to the mixture of saturated diamines:

MND Sample A (Used in Example II): This sample was part of fraction 24 and had the composition given for fraction 24.

MND Sample B (Used in Examples III, IV and V): This was a blend of fractions 5, 6 and 70 weight percent of fraction 22. The calculated composition, by weight, was:

| | |
|---|---|
| 2,4,6-trimethyl-1,7-heptanediamine | 0.2% |
| 2,4-dimethyl-1,8-octanediamine | 11.0% |
| 5-methyl-1,9-nonanediamine | 87.7% |
| N-methylated C$_{10}$ diamines | 1.1% |

MND Sample C (Used in Example VI): This was a blend of fractions 7 through 21, 30 weight percent of fraction 22, fraction 23, and 50 weight percent of fraction 24. The calculated composition, by weight, was:

| | |
|---|---|
| 2,4,6-trimethyl-1,7-heptanediamine | 0.1% |
| 2,4-dimethyl-1,8-octanediamine | 11.5% |
| 5-methyl-1,9-nonanediamine | 87.3% |
| N-methylated C$_{10}$ diamines | 1.2% |

Although the diadduct contained 7 dinitriles and the product of the first stage reduction contained 7 diamines (not including N-methylated C$_{10}$ diamines), samples A, B, and C of the product of the second stage reduction contained only the 3 saturated diamine isomers 5-methyl-1,9-nonanediamine, 2,4-dimethyl-1,8-octanediamine, and 2,4,6-trimethyl-1,7-heptanediamine (again excluding the traces of N-methylated C$_{10}$ diamines). This results from the conversion of both 5-methylenenonanedinitrile and 5-methyl-4-nonenedinitrile to 5-methyl-1,9-nonanediamine, the conversion of each of 2-methyl-4-methyleneoctanedinitrile, 2,4-dimethyl-4-octenedinitrile, and 2,4-dimethyl-3-octenedinitrile to 2,4-dimethyl-1,8-octanediamine, and the conversion of both of 2,6-dimethyl-4-methyleneheptanedinitrile and 2,4,6-trimethyl-3-heptenedinitrile to 2,4,6-trimethyl-1,7-heptanedinitrile. No unsaturation in any of MND samples A, B, and C was detected by gas-liquid chromatographic analysis.

EXAMPLE II

In a 2-liter Erlenmeyer flask was slurried 41.52 grams (0.25 mole) of terephthalic acid in 500 milliliters of absolute ethanol. A solution of 44.80 grams (0.26 mole) of MND sample A (See Example I) in 250 milliliters of absolute ethanol was added, and the resulting mixture was diluted with 400 milliliters of absolute ethanol. The admixture was stirred magnetically and refluxed for 72 hours, and then cooled to 0°C in an ice bath. The resulting diamine salt precipitate was collected by filtration. After drying the resulting filter cake in vacuo at 80°C, 80.5 grams of salt was obtained, having a pH of 7.9 as a 1 weight percent aqueous solution. A small sample of dried salt was treated with KOH to liberate the diamine. The liberated diamine was analyzed by gas-liquid chromatography and found to be 99.5 weight percent 5-methyl-1,9-nonanediamine and 0.5 weight percent N-methylated $C_{10}$ diamines.

To a 1-liter autoclave was charged 79.87 grams (0.236 mole) of the dried salt, 0.98 gram (0.0059 mole) of terephthalic acid and 20 milliliters of distilled water. Air was removed from the autoclave by alternatively flushing with 60 psig nitrogen and evacuating three times. The system was closed off under 60 psig nitrogen and heated in the following manner:

| Time, min. | Temperature, °C. | Comments |
|---|---|---|
| 30 | ~25–210 | heated at an at least substantially uniform rate |
| 150 | 210 | temperature maintained at least substantially constant |
| 30 | 210–290 | heated at an at least substantially uniform rate |
| 30 | 290 | maximum pressure registered was 290 psig |
| 30 | 290 | vented slowly to atmospheric pressure |
| 30 | 290 | slow nitrogen flush |
| 15 | 290 | pressure slowly reduced to 20 mm Hg |
| 30 | 290 | 20 mm Hg pressure |

The outlet plug was removed from the bottom of the autoclave, and most of the polymer was extruded into an aqueous bath using nitrogen pressure. The aqueous bath contained chunks of dry ice to provide a layer of carbon dioxide from the autoclave outlet to the surface of the aqueous bath. The polymer remaining in the autoclave was cooled to about 25°C under nitrogen and chipped out. The combined polymer product was ground in a Wiley mill. The resulting ground polymer product, hereinafter designated as Polyamide II, had an inherent viscosity of 0.71 as measured at 30°C in a m-cresol solution having a polymer concentration of 0.5 gram/100 milliliters solution, a polymer melt temperature (PMT) of 240°C, a glass transition temperature ($T_g$) of 107°C, and a crystalline melting point ($T_m$) of 257°C. The determinations of inherent viscosity, PMT, $T_g$, and $T_m$ are described in pages 41–50 of Sorenson and Campbell, "Preparative Methods of Polymer Chemistry", (1961) Interscience Publishers, Inc., New York, with the values for $T_g$ and $T_m$ being determined by differential thermal analysis of samples which had been premelted at 290°C and quenched. In these determinations of $T_g$ and $T_m$ the heating rate of the quenched samples was 10°C per minute, and these determinations were made in an inert atmosphere.

EXAMPLE III

In a 2-liter Erlenmeyer flask was slurried 41.52 grams (0.25 mole) of terephthalic acid in 500 milliliters of absolute ethanol. A solution of 44.80 grams (0.26 mole) of MND sample B (See Example I) in 250 milliliters of absolute ethanol was added, and the resulting mixture was diluted with additional absolute ethanol to a total volume of about 1600 milliliters. This operation was repeated and the two batches were stirred magnetically and refluxed for 72 hours. They were then cooled to 0°C, and the resulting diamine salt precipitate was collected by filtration. After drying the resulting filter cake in vacuo at 80°C, 168 grams of salt was obtained, having a pH of 8.2 as a 1 weight percent aqueous solution.

To a 1-liter autoclave were charged 159.57 grams (0.4715 mole) of the above salt, 1.96 grams (0.0118 mole) of terephthalic acid, and 45 milliliters of distilled water. Air was removed from the autoclave by alternately flushing with 60 psig nitrogen and evacuating three times. The system was closed off under 60 psig nitrogen and heated in the following manner:

| Time, min. | Temperature, °C. | Comments |
|---|---|---|
| 30 | ~25–210 | heated at an at least substantially uniform rate |
| 165 | 210 | temperature maintained at least substantially constant |
| 30 | 210–290 | heated at an at least substantially uniform rate |
| 60 | 290 | maximum pressure registered was 440 psig |
| 30 | 290 | vented slowly to atmospheric pressure |
| 30 | 290 | slow nitrogen flush |
| 15 | 290 | pressure slowly reduced to 20 mm Hg |
| 30 | 290 | 20 mm Hg pressure |

The outlet plug was removed from the bottom of the autoclave, and most of the polymer was extruded into an aqueous bath using nitrogen pressure. The aqueous bath contained chunks of dry ice to provide a layer of carbon dioxide from the autoclave outlet to the surface of the aqueous bath. The polymer remaining in the autoclave was cooled to about 25°C under nitrogen and chipped out. The combined polymer product was ground in a Wiley mill. The resulting group polymer product, hereinafter designated as Polyamide III, and an inherent viscosity of 0.79 as measured at 30°C in a m-cresol solution having a polymer concentration of 0.5 gram/100 milliliters solution, a PMT of 240°C, a $T_g$ of 109°C, and a $T_m$ of 254°C.

EXAMPLE IV

A mixture of 83.04 grams (0.50 mole) of terephthalic acid, 89.60 grams (0.52 mole) of MND sample B (See Example 1), and 86.32 grams of deionized water was placed in a 500-milliliter Erlenmeyer flask. The mixture was warmed with stirring until dissolution occurred. The solution was filtered and the filtrate was added to 2600 milliliters of methanol, while stirring, whereupon some precipitation occurred. The resulting slurry was cooled in an ice-salt bath to cause further precipitation of the salt. The precipitated salt was collected by filtration and dried in vacuo at 80°C. The dried salt (129.8 grams) had a pH of 7.5 as a 1 weight percent aqueous solution.

To a 1-liter autoclave were charged 129.3 grams (0.3821 mole) of the above dried salt, 1.58 grams (0.0095 mole) of terephthalic acid, and 45 milliliters of deionized water. Air was removed from the autoclave by alternately flushing with 60 psig nitrogen and evacuating three times. The mixture was then placed under 60 psig nitrogen, and heated in the following manner:

| Time, min. | Temperature, °C. | Comments |
|---|---|---|
| 30 | ~25–210 | heated at an at least substantially uniform rate |
| 165 | 210 | temperature maintained at least substantially constant |
| 30 | 210–290 | heated at an at least substantially uniform rate |
| 30 | 290 | maximum pressure registered was 500 psig |
| 30 | 290 | vented slowly to atmospheric pressure |
| 30 | 290 | slow nitrogen flush |
| 15 | 290 | pressure slowly reduced to 20 mm Hg |
| 30 | 290 | 20 mm Hg pressure |

The outlet plug was removed from the bottom of the reactor, and most of the molten polymer was extruded using nitrogen pressure into a water bath containing dry ice. The polymer remaining in the autoclave was cooled to about 25°C under nitrogen and then chipped out. The resulting polyamide product, hereinafter designated as Polyamide IV, had an inherent viscosity of 0.73 as measured at 30°C in a m-cresol solution having a polyamide concentration of 0.5 gram/100 milliliters solution, a PMT of 240°C, a $T_g$ of 106°C, and a $T_m$ of 257°C.

EXAMPLE V

In a 1-liter Erlenmeyer flask were placed 68.5 grams (0.413 mole) of terephthalic acid and 150 milliliters of a mixture of 90 volume percent methanol and 10 volume percent water. The resulting slurry was stirred magnetically, and a solution of 74.07 grams (0.429 mole) of MND sample B (See Example I) in 150 milliliters of a mixture of 90 volume percent methanol and 10 volume percent water was added. A nearly homogeneous solution was obtained briefly which then set up to an immobile white semi-solid. The mixture was stirred manually, allowed to stand at about 25°C for 15 minutes, and then cooled in an ice bath for 2 hours. The resulting diamine salt precipitate was collected by filtration and dried at 70°–80°C under nitrogen in vacuo to give 136.5 grams of dried salt, having a pH of 8.6 as a 1 weight percent aqueous solution.

To a 1-liter autoclave were charged 135.4 grams (0.400 mole) of the above dried salt, 1.66 grams (0.010 mole) of terephthalic acid, and 35 milliliters of distilled water. Air was removed by alternately flushing with 60 psig nitrogen and evacuating three times. The system was closed off under 60 psig nitrogen, and the mixture was heated in the following manner:

| Time, min. | Temperature, °C. | Comments |
|---|---|---|
| 30 | ~25–210 | heated at an at least substantially uniform rate |
| 165 | 210 | temperature maintained at least substantially constant |
| 30 | 210–290 | heated at an at least substantially uniform rate |
| 30 | 290 | temperature maintained at least substantially constant, highest pressure registered was 360 psig |
| 30 | 290 | vented slowly to atmospheric pressure |
| 30 | 290 | slow nitrogen flush |
| 15 | 290 | pressure slowly reduced to 20 mm Hg |
| 30 | 290 | 20 mm Hg pressure |

The outlet plug was removed from the bottom of the autoclave, and most of the molten polymer was extruded using nitrogen pressure into an aqueous bath containing dry ice. The polymer remaining in the autoclave was cooled under nitrogen to about 25°C and chipped out. The combined polymer product, hereinafter designated as Polyamide V, had an inherent viscosity of 0.86 as measured at 30°C in a m-cresol solution having a polyamide concentration of 0.5 gram/100 milliliters solution, a PMT of 240°C, a $T_g$ of 110°C, and a $T_m$ of 252°C.

EXAMPLE VI

To a 1-liter autoclave were charged 51.69 grams (0.300 mole) of MND sample C (See Example I), 50.48 grams (0.3039 mole) of terephthalic acid, and 25.5 grams of distilled water. Air was removed from the autoclave by alternately flushing with 60 psig nitrogen and evacuating three times. The system was closed off under 60 psig nitrogen and then heated in the following manner:

| Time, min. | Temperature, °C. | Comments |
|---|---|---|
| 30 | ~25–210 | heated at an at least substantially uniform rate |
| 150 | 210 | temperature maintained at least substantially constant |
| 30 | 210–290 | heated at an at least substantially uniform rate |
| 30 | 290 | maximum pressure registered was 260 psig |
| 30 | 290 | vented slowly to atmospheric pressure |
| 30 | 290 | slow nitrogen flush |
| 15 | 290 | pressure slowly reduced to 20 mm Hg |
| 30 | 290 | 20 mm Hg pressure |

The outlet plug was removed from the bottom of the reactor, and most of the molten polymer was extruded using nitrogen pressure into an aqueous bath containing dry ice. The polymer remaining in the autoclave was cooled to about 25°C under nitrogen and then chipped out. The combined polymer product was chopped in a Wiley mill. The resulting polymer product, hereinafter designated as Polyamide VI, had an inherent viscosity of 0.73 as measured at 30°C in a m-cresol solution having a polyamide concentration of 0.5 gram/100 milliliters solution, a PMT of 230°C, a $T_g$ of 107°C, and a $T_m$ of 251°C.

Figure 3:
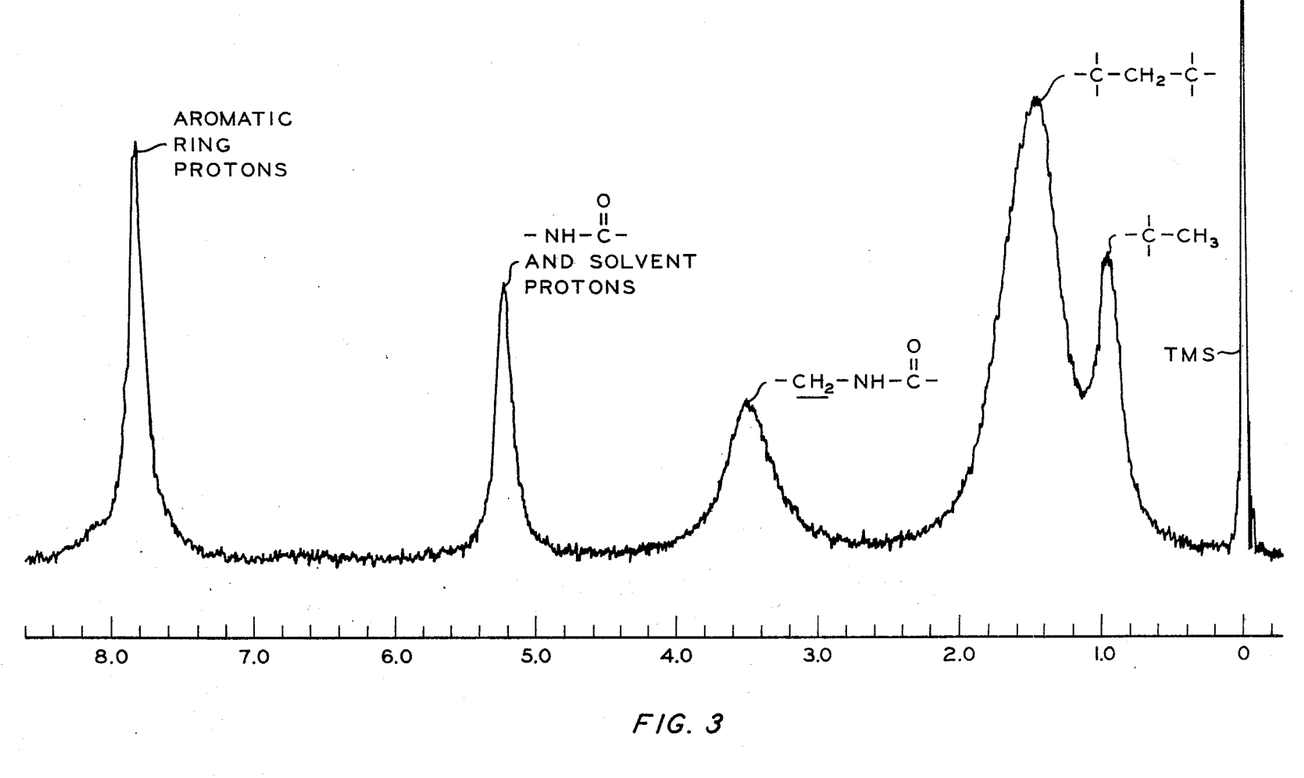
Figure 4:
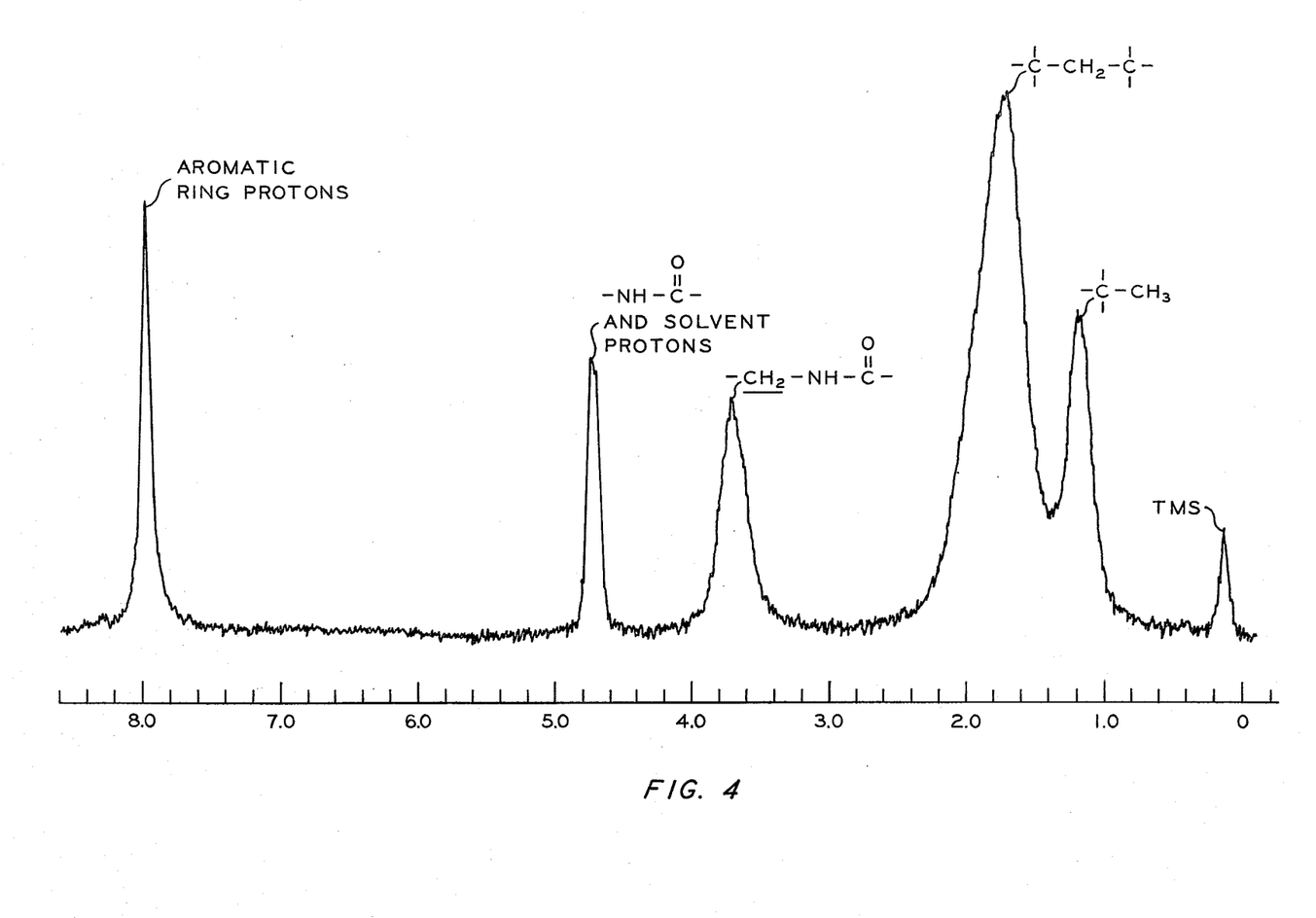

The NMR spectra for Polyamide VI at about 35°C and about 70°C are shown in FIGS. 3 and 4, respectively. The spectra were made utilizing tetramethylsilane (TMS) as a standard and hexafluoroacetone.1.6 $D_2O$ solvent. The peaks in FIGS. 3 and 4, reading from left to right, correspond to aromatic ring protons, solvent protons and the protons, the protons of methylene adjacent a nitrogen the protons of alkyl methylenes the protons of alkyl methyls and the protons of tetramethylsilane. The spectra of FIGS. 3 and 4 do not show any detectable peaks corresponding to olefinic protons (=CH—), the protons of methylenes allylic to double bonds (=C—CH₂—), or the protons of methyls allylic to double bonds (=C—CH₃).

EXAMPLE VII

A solution of 89.6 grams (0.52 mole) of MND (86.5 grams of which contained 90.29 weight percent 5-methyl-1,9-nonanediamine and 8.44 weight percent 2,4-dimethyl-1,8-octanediamine, and 3.1 grams of which contained 90.76 weight percent 5-methyl-1,9-nonanediamine and 6.27 weight percent 2,4-dimethyl-1,8-octanediamine) in 500 milliliters of absolute ethanol was added to a slurry of 83.05 grams (0.50 mole) of terephthalic acid in 1 liter of absolute ethanol. The mixture was stirred and refluxed, with an additional 1 liter of absolute ethanol added to facilitate stirring, for 72 hours. It was then cooled in an ice bath, and the resulting diamine salt precipitate was collected by filtration. After drying of the resulting filter cake at 80°C in a vacuum oven overnight, 167.4 grams of the dried salt was obtained, having a pH of 8.0 as a 1 weight percent aqueous solution.

In an unstirred 1-liter autoclave were placed 166.66 grams (0.4925 mole) of the above dried salt, 2.46 grams (0.0148 mole) of terephthalic acid and 45 milliliters of deionized water. Air was removed from the autoclave by alternately flushing with 60 psig nitrogen and evacuating three times. The system was closed off under 60 psig nitrogen. The reaction mixture was heated at an at least substantially uniform rate under nitrogen pressure to 210°C, where it was held for 2 hours and 45 minutes, and then heated at an at least substantially uniform rate to 290°C. Heating was continued to maintain the temperature at 290°C for a first ½ hour at 400–500 psig, venting as necessary to maintain this pressure, a second ½ hour as the volatiles were slowly vented to atmospheric pressure, a third ½ hour under a slow nitrogen flush, an additional 15 minutes as the pressure was slowly reduced to 20 millimeters Hg, and a final ½ hour at 20 millimeters Hg. Nitrogen pressure was used to extrude most of the molten polymer from the bottom of the reactor into an aqueous bath containing dry ice. The polymer remaining in the autoclave was cooled to about 25°C under nitrogen and then chipped out. The combined product was chopped in a Wiley mill. The resulting polymer product, hereinafter designated as Polyamide VII, had an inherent viscosity of 0.73 as measured at 30°C in a m-cresol solution having a polyamide concentration of 0.5 gram/100 milliliters solution and a PMT of 240°C.

EXAMPLE VIII

A solution of 89.6 grams (0.52 mole) of MND (containing 90.29 weight percent 5-methyl-1,9-nonanediamine and 8.44 weight percent 2,4-dimethyl-1,8-octanediamine) in 500 milliliters of absolute ethanol was added to a slurry of 83.05 grams (0.50 mole) of terephthalic acid in 1 liter of absolute ethanol. The mixture was stirred and refluxed, with an additional 1 liter of absolute ethanol added to facilitate stirring, for 72 hours. The mixture was then cooled in an ice bath, and the solids were collected by filtration. After drying the thus collected solids at 80°C in a vacuum oven overnight, 164.2 grams of the dried salt was obtained, having a pH of 7.8 as a 1 weight percent aqueous solution.

To an unstirred 1-liter autoclave were charged 163.2 grams (0.4823 mole) of the above dried salt, 2.01 grams (0.0121 mole) of terephthalic acid, and 45 milliliters of deionized water. Using conditions described in Example VII, a polymer, hereinafter designated as Polyamide VIII, was obtained having an inherent viscosity of 0.84 as measured at 30°C in a m-cresol solution having a polyamide concentration of 0.5 gram/100 milliliters solution, a PMT of 240°C, a $T_g$ of 111°C, and a $T_m$ of 254°C.

EXAMPLE IX

A salt of MND and terephthalic acid was made by the method described in Example VIII, using MND of the composition described in Example VIII. The resulting dried salt (167.8 grams) had a pH of 7.5 as a 1 weight percent aqueous solution.

In an unstirred 1-liter autoclave were placed 166.1 (0.4908 mole) of the above dried salt, 1.63 grams (0.0098 mole) of terephthalic acid, and 45 grams of deionized water. Polymerization conditions described in Example VII yielded a polyamide, hereinafter designated as Polyamide IX, having an inherent viscosity of 0.91 as measured at 30°C in a m-cresol solution having a polyamide concentration of 0.5 gram/100 milliliters solution, a PMT of 240°C, a $T_g$ of 108°C, and a $T_m$ of 250°C.

EXAMPLE X

A salt of MND and terephthalic acid was prepared by the method shown in Example VIII, using MND of the composition shown in that example. The resulting dried salt (171 grams) had a pH of 7.9, measured as a 1 weight percent aqueous solution.

In an unstirred 1-liter autoclave were charged 167.46 grams (0.4949 mole) of the above dried salt, 0.30 gram (0.005 mole) of acetic acid, and 45 milliliters of deionized water. Polymerization conditions described in Example V, except that the period of time at 210°C was 3 hours, yielded a polymer, hereinafter designated as Polyamide X, having an inherent viscosity of 1.22 at 30°C in a m-cresol solution having a polyamide concentration of 0.5 gram/100 milliliters solution, a PMT of 240°C, a $T_g$ of 111°C, and a $T_m$ of 258°C.

Mechanical properties of Polyamide X, compression molded at 280°C, were found to be as follows:

| | |
|---|---|
| Tensile Strength, psi [a] | 10210 |
| Elongation, % [a] | 16 |
| Flexural Modulus, psi × 10⁻³ [b] | 322 |
| Izod Impact Strength, ft-lb/in notch [c] | 0.9 |
| Heat Deflection Temperature, 264 psi, °F [d] | 236 |
| Shore D Hardness [e] | 83 |

[a] ASTM D 638-68
[b] ASTM D 790-66
[c] ASTM D 256-66
[d] ASTM D 648-56
[e] ASTM D 1706-61, Shore durometer, type D.

The above values for the mechanical properties shown demonstrate the value of the polyamide as a molding resin.

EXAMPLE XI

A diadduct prepared in accordance with the procedure of Example I was hydrogenated in two sequential stages. In the first stage 60 grams of diadduct (5-methylenenonanedinitrile and 5-methyl-4-nonenedinitrile, 89.2 weight percent; 2-methyl-4-methyleneoctanedinitrile, 2,4-dimethyl-4-octenedinitrile, and 2,4-dimethyl-3-octenedinitrile, 9.5 weight percent; and 2,6-dimethyl-4-methyleneheptanedinitrile and 2,4,6-trimethyl-3-heptenedinitrile, 1.3 weight percent), 350 milliliters of methanol, and 2.0 grams of 10 weight percent of palladium on carbon were charged to a 1-liter autoclave. The autoclave was flushed with nitrogen and then pressured to 1400 psig with hydrogen and heated at 110°C for 2 hours. The reactor was then vented, and the reactor effluent was filtered to remove solids and then concentrated in a rotary evaporator. In the second stage, the concentrated product of the first stage was charged to a 1-liter autoclave along with 350 milliliters of methanol and 1½ tsp of Raney nickel. The autoclave was flushed with nitrogen, then charged with 170 grams of ammonia, pressured to 1400 psig with hydrogen, and heated at 130°C for 2 hours. The reactor effluent was then filtered and concentrated in a rotary evaporator. The concentrate was distilled through a 6-inch column packed with Helipak to obtain the following fractions:

TABLE II

| Fraction | Boiling Point | Pressure | Pot Temperature | Weight |
|---|---|---|---|---|
| 1 | ~128°C | 10 mm Hg | ~138°C | 1.3 grams |
| 2 | 128–130°C | 10 mm Hg | 138–140°C | 2.0 grams |
| 3 | 130–131°C | 10 mm Hg | 140–178°C | 53.0 grams |
| Residue | — | — | — | 6.0 grams |

To a 1-liter autoclave were charged 34.26 grams (0.200 mole) of fraction 3, 33.55 grams (0.202 mole) of terephthalic acid, and 17 milliliters of distilled water. Fraction 3 had a composition of 50.4 weight percent 5-methyl-1,9-nonanediamine, 5.8 weight percent 2,4-dimethyl-1,8-octanediamine, 19.4 weight percent of a first $C_{10}$ olefinic diamine, and 24.4 weight percent of a second $C_{10}$ olefinic diamine, as determined by gas-liquid chromatography. Air was removed from the atuoclave by alternately flushing with 60 psig nitrogen and evacuating three times. The system was closed off under 60 psig nitrogen and heated in the following manner:

| Time, min. | Temperature, °C. | Comments |
|---|---|---|
| 30 | 25–210 | heated at an at least substantially uniform rate |
| 150 | 210 | temperature maintained at least substantially constant |
| 30 | 210–290 | heated at an at least substantially uni- |

-continued

| Time, min. | Temperature, °C. | Comments |
| --- | --- | --- |
|  |  | form rate |
| 30 | 290 | maximum pressure registered was 280 psig |
| 30 | 290 | vented slowly to atmospheric pressure |
| 30 | 290 | slow nitrogen flush |
| 15 | 290 | pressure slowly reduced to 20 mm Hg |
| 30 | 290 | 20 mm Hg pressure |

The outlet plug was removed from the bottom of the autoclave, and most of the polymer was extruded into an aqueous bath using nitrogen pressure. The aqueous bath contained chunks of dry ice to provide a layer of carbon dioxide from the autoclave outlet to the surface of the aqueous bath. The polymer remaining in the autoclave was cooled to about 25°C under nitrogen and chipped out. The combined polymer product was ground in a Wiley mill. The resulting ground polymer product, hereinafter designated as Polyamide XI, had an inherent viscosity of 0.58 as measured at 30°C in a m-cresol solution having a polymer concentration of 0.5 gram/100 milliliters solution, a PMT of 230°C, a $T_g$ of 107°C, and a $T_m$ of 245°C.

Figure 5:
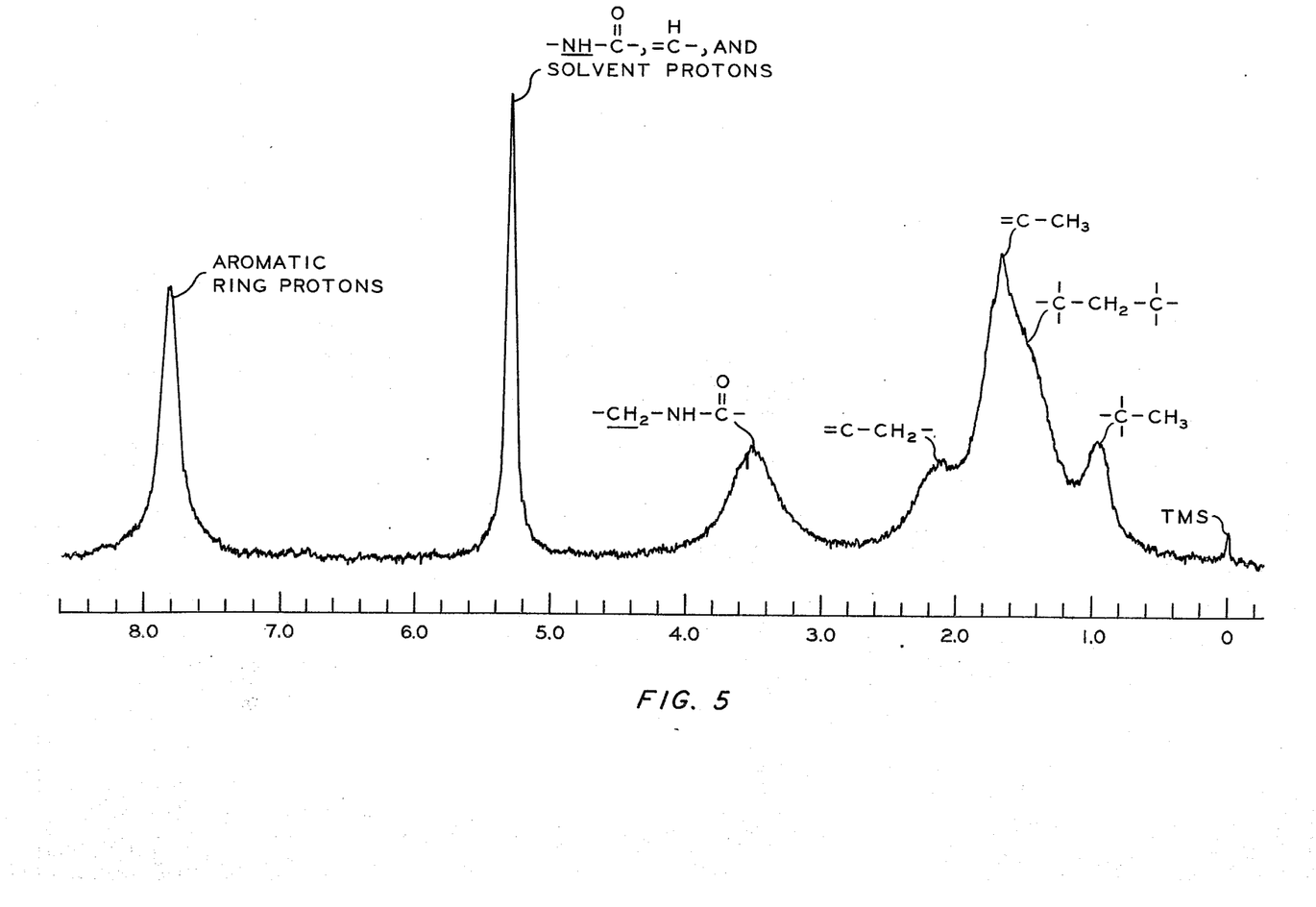
FIGS. 5 and 6 are reproductions of NMR spectra for a polymer outside the scope of the present invention.
Figure 6:
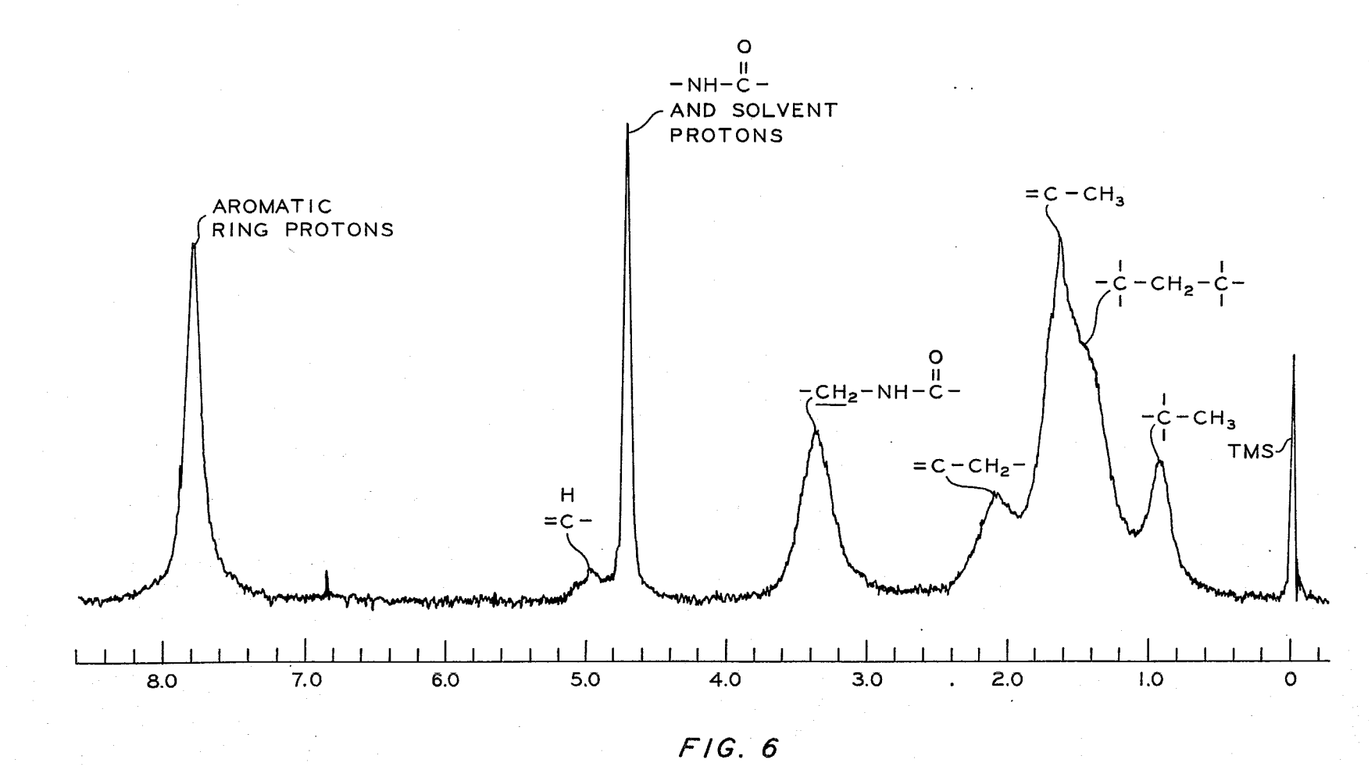

Infrared analysis of fraction 3 disclosed a band for methyl groups at about 7.25 microns and no significant peak at 11.25 microns (associated with $RR'C=CH_2$), thus indicating that the vinylidene groups had been saturated. However, nuclear magnetic resonance analysis showed that fraction 3 was about a 50/50 mixture of olefinically unsaturated and saturated aliphatic $C_{10}$ diamines. The NMR spectra for Polyamide XI at about 35°C and at about 70°C are shown in FIGS. 5 and 6. These spectra were made utilizing tetramethylsilane (TMS) as a standard and hexafluoroacetone.1.6 $D_2O$ solvent. As the hexafluoroacetone solvent had an NMR peak which overlapped the olefinic resonance peak for measurements at 35°C (FIG. 5), a second spectrum (FIG. 6) was made by heating the sample to about 70°C, at which temperature the peak for the active protons of the hexafluoroacetone and the amide groups shifted upfield to about 4.7 ppm, leaving the olefinic resonance peak at about 5.0 ppm. Direct measurement of the olefinic protons (=CH—) in relation to the protons showed that the polymer had about 50 olefinic double bonds per 100 diamine units. The olefinic resonance was in the chemical shift region (5.0 ppm) expected for branched internal olefinic protons (RR'C = CHR'') which showed that the olefinic diamine had the structure and not Thus, substantially total vinylidene group reduction had occurred, but a significant portion of the internal olefinic bonds remained. Other features were present in the NMR spectrum of Polyamide XI that demonstrated the presence of unsaturated amide units. Major resonances were observed for allylic methylene and allylic methyl units at 2.2 and 1.8 ppm, respectively, that were not present in the NMR spectrum of Polyamide VI. The sharp constrast between the NMR spectra of Polyamides VI and XI offer irrefutable evidence for the significant difference in molecular structure. An attempt to reduce a purified mixture of 5-methylenenonanedinitrile and 5-methyl-4-nonenedinitrile with 10 percent palladium on carbon at 50°C and 1000 psig hydrogen pressure was largely unsuccessful with only a small amount of double bond reduction as indicated by NMR analysis. More vigorous conditions (higher temperature and pressure) resulted in more olefin reduction but even the most severe conditions (125°C and 1500 psig for four hours) did not give complete double bond reduction. NMR analysis of this latter product indicated total vinylidene group reduction had occurred but about 30 percent of the trisubstituted olefin remained. These data suggested that palladium reduced the vinylidene groups without great difficulty, but conditions which would result in hydrogenation of the more sterically hindered (and therefore more difficulty reduced) trisubstituted olefinic linkages were probably severe enough to initiate reduction of nitrile to amine, and amines poison palladium catalysts.

EXAMPLE XII

To a 1-liter autoclave was charged 86.15 grams (0.500 mole) of MND sample C (See Example I), 83.88 grams (0.505 mole) terephthalic acid, and 42 milliliters of distilled water. The mixture was polymerized in accordance with the procedure of Example VI with the maximum registered pressure being 450 psig. The resulting polymer product had an inherent viscosity of 0.96 as measured at 30°C in a m-cresol solution having a polyamide concentration of 0.5 gram/100 milliliters solution, a PMT of 230°C, a $T_g$ of 111°C, and a $T_m$ of 251°C. A sample of the polymer was compression molded at 540°C and quenched, giving molded objects having the following mechanical properties:

| | |
| --- | --- |
| Tensile Strength, psi [a] | 10290 |
| Elongation, % [a] | 98 |
| Flexural Modulus, psi × $10^{-3}$ [b] | 274 |
| Izod Impact Strength, ft-lb/in notch [c] | 2.19 |
| Heat Deflection Temperature, 264 psi, °F [d] | 224 |

| | |
|---|---|
| -continued | |
| Shore D Hardness [e] | 83 |

[a] ASTM D 638-68
[b] ASTM D 790-66
[c] ASTM D 256-66 [d] ASTM D 648-56
[e] ASTM D 1706-61, Shore durometer, type D.

EXAMPLE XIII

The polyamides produced in Examples II–XI were produced in the absence of any plasticizers for the polymer and were melt spun and drawn into fibers, also in the absence of any plasticizers for the polymer, in the following manner: The polymer in chip form was dried at 100°C under vacuum for 18 to 24 hours immediately prior to spinning. About 15 grams of polymer was charged while warm to the nitrogen-purged ½ inch diameter barrel of an extruder, preheated to 150°C, and the barrel closed immediately with the close fitting piston. Nitrogen was purged through the polymer chips and out the spinneret while the piston was advanced to pack the polymer with about 900 pounds (2920 psi) pressure. The extruder was equipped with a combination (325, 200, 100, 60 mesh) screen pack and a one-hold 20 mil diameter spinneret with 50 mil land length and 60° entry angle. After packing the polymer for one minute, the temperature of the lower portion of the barrel was increased while about 900 pounds pressure was maintained. When polymer started to extrude, forward motion of the piston was stopped and the temperature adjusted to about 30°C above that at which extrusion started. Polymer was then extruded at the rate of one cubic centimeter per minute. If the pressure was high (above about 700 pounds) or the extrudate melt fractured, the temperature was raised. If the pressure was low (below about 200 pounds), or if polymer dripped or fell too rapidly to handle, the temperature was lowered. After the temperature was adjusted, the extruded filament was dropped through a four-inch diameter, four-foot long glass pipe to provide air quench. It was then taken around a hysteresis brake to a Godet roll driven at about 1000 feet per minute and finally to a constant tension winder. The Godet roll speed was then adjusted to 400 FPM and extrusion continued. These conditions result in a melt draw ratio of 25 and a spun denier of 74 if the density at spin temperature is one.

Drawing was carried out as follows: The spun filament was taken from the constant tension and wound package through a disc tensioner and around a feed Godet roll operated at 20 FPM. It was then drawn in contact with an eight-inch heated plate at 225°C and passed to a draw Godet roll turning at about 40 FPM. If the filament stuck to the plate or broke immediately, the temperature of the plate was decreased in 25°C steps until a workable temperature was reached. The speed of the draw Godet roll was increased slowly until the filament broke. The draw Godet roll speed was then decreased about 10 FPM and the drawing attempted. If drawing was not successful, the draw Godet roll speed was decreased in 10 FPM steps until drawing could be accomplished without breaks. The drawn filament was taken up on a constant tension winder. Boiling water shrinkage and other properties were determined on the fiber.

Annealing, when conducted, was carried out by winding the drawn filament around a 600 ml stainless steel beaker and restraining both ends so that no shrinkage could take place. A thermocouple was fastened to the surface of the beaker. The assembly was then put in an oven preheated to 200°C. It was left in the oven until the thermocouple indicated the desired temperature. Seven minutes' time was required to heat the assembly to 185°C. Boiling water shrinkage and tensile properties were determined on the annealed filament.

Table III shows the spinning and drawing conditions used with each of Polyamides II through XI from Examples II through XI, respectively, together with properties of the fibers as drawn and, when determined, after boiling. The properties of nylon 66 fibers, using the same spinning and drawing equipment, are shown for the purpose of comparison. Tables IV and V show the effect of annealing on properties of the fibers produced in runs 9, 10 and 11 from Polyamide VIII.

TABLE III

| Run | 1 | 2 | 3 | 4 | 5 | 6 | 7 | 8 | 9 |
|---|---|---|---|---|---|---|---|---|---|
| Polyamide | II | III | IV | V | V | VI | VII | VII | VIII |
| Inherent viscosity[b] | 0.71 | 0.79 | 0.73 | 0.86 | 0.86 | 0.73 | 0.73 | 0.73 | 0.84 |
| Spin temperature, °C | 260 | 270 | 270 | 280 | 290 | 270 | 260 | 250 | 290 |
| Draw temperature, °C | 150 | 150 | 150 | 150 | 150 | 150 | 150 | 150 | 150 |
| Draw ratio | 5 | 5 | 5 | 4.5 | 5 | 5 | 5 | 4 | 5 |
| Fiber properties, as drawn | | | | | | | | | |
| Denier | 16 | 16 | 18 | 19 | 18 | 17 | 18.6 | 24.8 | 17.8 |
| Tenacity, gpd[c] | 5.6 | 5.9 | 6.1 | 5.6 | 6.1 | 5.5 | 5.4 | 4.4 | 5.5 |
| Elongation, %[c] | 14 | 14 | 18 | 15 | 14 | 15 | 14 | 22 | 18 |
| Initial modulus, gpd[c] | 33 | 39 | 37 | 40 | 43 | 41 | 43 | 37 | 41 |
| Boiling water shrinkage, %[d] | 13.1 | 14.6 | 13.2 | 15.8 | 15.9 | 14.1 | 14.2 | 13.0 | 12.9 |
| Zero strength temperature, °C[e] | 227 | 218 | 225 | 223 | 218 | 221 | — | — | 221 |
| Fiber properties, after boiling[f] | | | | | | | | | |
| Tenacity, gpd[c] | — | — | — | — | — | — | 4.1 | 3.5 | 3.8 |
| Elongation, %[c] | — | — | — | — | — | — | 30 | 32 | 33 |
| Initial modulus, gpd[c] | — | — | — | — | — | — | 23 | 23 | 23 |

| Run | 10 | 11 | 12 | 13 | 14 | 15 | 16 | 17 | 18 |
|---|---|---|---|---|---|---|---|---|---|
| Polyamide | VIII | VIII | IX | IX | X | XI | XI | XI | Nylon 66[a] |
| Inherent viscosity[b] | 0.84 | 0.84 | 0.91 | 0.91 | 1.2 | 0.58 | 0.58 | 0.58 | — |
| Spin Temperature, °C | 290 | 290 | 305 | 320 | 350 | 245 | 245 | 245 | 265 |
| Draw temperature, °C | 150 | 150 | 125 | 175 | 175 | 125 | 125 | 125 | 100 |
| Draw ratio | 5 | 2.4 | 3.5 | 4 | 3 | 5 | 4 | 2.4 | 5 |
| Fiber properties, as drawn | | | | | | | | | |
| Denier | 17 | 30 | 32.6 | 21.0 | 57 | 16 | 20 | 32 | 16.5 |
| Tenacity, gpd[c] | 5.4 | 2.1 | 2.0 | 3.7 | 2.6 | 4.5 | 3.4 | 1.8 | 5.6 |
| Elongation, %[c] | 15 | 65 | 53 | 29 | 69 | 17 | 36 | 79 | 26 |
| Initial modulus, gpd[c] | 35 | 22 | 35 | 34 | 34 | 34 | 32 | 24 | 42 |

TABLE III-continued

| | | | | | | | | | |
|---|---|---|---|---|---|---|---|---|---|
| Boiling water shrinkage, %[d] | 12.9 | 19.5 | 15.4 | 11.6 | — | 16.0 | 13.0 | 47[g] | 13.7 |
| Zero strength temperature, °C[e] | 222 | 215 | — | 222 | — | 195 | 205 | 170 | — |
| Fiber properties, after boiling[f] | | | | | | | | | |
| Tenacity, gpd[c] | 4.3 | 1.2 | 1.8 | 3.0 | — | — | — | — | 4.9 |
| Elongation, %[c] | 30 | 86 | 59 | 35 | — | — | — | — | 36 |
| Initial modulus, gpd[c] | 28 | 23 | 23 | 24 | — | — | — | — | 44 |

[a]Commercial fiber grade nylon 66 (Chemstrand 10V).
[b]Measured at 30°C in a m-cresol solution having a polyamide concentration of 0.5 g/100 ml solution.
[c]ASTM D 2256-69, using an optional rate of elongation of 100 percent per minute.
[d]Procedure used was as follows: A loop of filament was made having a circumference of 1.8-2 meters with ends tied together. The loop was hung on a hook at the top of a vertical meter stick. A weight of 1.2 grams was placed on a hook at the bottom of the loop, after which the length of the loop was measured. The loop was then removed from both hooks and wound into a coil having a diameter of about 2 inches. The coil was folded in cheesecloth and immersed in boiling water for 15 minutes. The coil and cheesecloth were removed from the boiling water, and the coil was removed from the cheesecloth and unwound. The loop was then placed on the hook on the meter stick, the weight was placed on a hook at the bottom of the loop, and the length of the loop was measured again.

Boiling water shrinkage (%) = $\frac{\text{original length of loop} - \text{length of loop after boiling water treatment}}{\text{original length of loop}} \times 100$.

[e]Journal of Polymer Science, 21, 228 (1956).
[f]Boiled in water as in footnote [d].
[g]Filament became brittle in boiling water and broke upon attempt to unwind the coil. It was necessary to determine the length of the loop after boiling water treatment while it remained in the coiled form.

TABLE IV[a]

| | As Drawn Run 9 | After Boiling Run 9 |
|---|---|---|
| Before Annealing | | |
| Tenacity, gpd | 5.5 | 3.8 |
| Elongation, % | 18 | 33 |
| Initial modulus, gpd | 41 | 23 |
| Boiling water shrinkage, % | 12.9 | — |
| After 185°C Annealing | | |
| Tenacity, gpd | 4.3 | 4.3 |
| Elongation, % | 20 | 25 |
| Initial modulus, gpd | 31 | 30 |
| Boiling water shrinkage, % | 0.5 | — |
| After 195°C Annealing | | |
| Tenacity, gpd | 4.2 | 3.9 |
| Elongation, % | 19 | 23 |
| Initial modulus, gpd | 28 | 27 |
| Boiling water shrinkage, % | 0.8 | — |

[a]See footnotes to Table III.

The hot-wet modulus was determined for one sample of the fiber annealed at 185°C. The initial modulus at room temperature and 60 percent relative humidity was 31 gpd while the initial modulus at 60°C in water was 27 gpd. This 87 percent retention of modulus at the 60°C wet condition is indicative of excellent behavior of fabrics in conventional washing and drying operations. The disperse dyeability of the fiber sample of run 9 annealed at 185°C was 7 (K/S).

TABLE V[a]

| | As Drawn | | After Boiling | |
|---|---|---|---|---|
| | Run 10 | Run 11 | Run 10 | Run 11 |
| Before Annealing | | | | |
| Tenacity, gpd | 5.4 | 2.1 | 4.3 | 1.2 |
| Elongation, % | 15 | 65 | 30 | 86 |
| Initial modulus, gpd | 35 | 22 | 28 | 23 |
| Boiling water shrinkage, % | 12.9 | 19.5 | — | — |
| After 185°C Annealing | | | | |
| Tenacity, gpd | 4.4 | 1.5 | 4.0 | 1.4 |
| Elongation, % | 26 | 39 | 18 | 16 |
| Initial modulus, gpd | 25 | 22 | 31 | 26 |
| Boiling water shrinkage, % | 4.5 | 0 | — | — |

[a]See footnotes to Table III.

As indicated in Tables III, IV, and V, the polyamides of this invention are useful in the production of high strength fibers with a good combination of dimensional stability in boiling water and retention of properties in a hot, wet environment, indicating good wash-wear behavior.

Infrared spectra of samples of Polyamides II, III, IV, V, VI, VIII, IX and XI have been recorded from 4000 to 625 cm$^{-1}$ using a Perkin-Elmer Model 257 spectrophotometer. A film of each sample polymer was prepared for infrared spectroscopic analysis by melting a pellet of the polymer and spreading it on a KBr disk. Films were prepared in a nitrogen atmosphere to prevent oxidation of the samples.

The spectra of all eight samples have infrared absorption bands which are characteristic of polyamides made from terephthalic acid and aliphatic $\alpha,\omega$-diamines. These bands are observed in the spectra near 3300, 3080, 2930, 2880, 1630, 1550, 1500, 1300, 1020, 870 and 740 cm$^{-1}$. Other weak-to-medium intensity bands are observed throughout the 2000-625 cm$^{-1}$ region.

Figure 1:
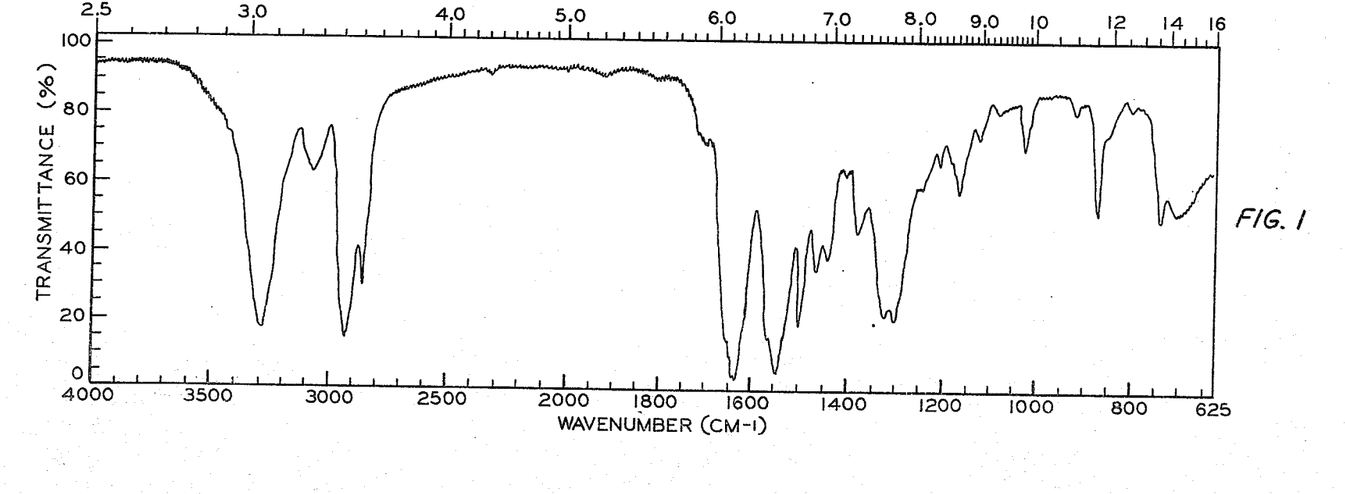
FIGS. 1 and 2 are reproductions of the infrared spectra of a representative polymer and a fiber produced therefrom.

The eight samples can be divided into the following four groups according to their spectral similarities and differences:

Group 1: Polyamides III, VI, VIII and IX
Group 2: Polyamide V
Group 3: Polyamides II and IV
Group 4: Polyamide XI The spectra of the samples within each group are essentially identical; therefore, no structural differences in the samples within each group were detected. The principal differences in the spectra of the four groups were found in the intensities and/or shapes of the bands near 3300, 1460, 1320, 1200, 910 and 700 cm$^{-1}$. THe infrared spectrum for Polyamide V, which is considered to be representative, is shown in FIG. 1 of the drawings. The 1460 cm$^{-1}$ band is weaker in the spectrum of the Group 4 sample than in the spectra of the other groups. This band is undoubtedly due to a vibrational mode of the diamine monomer unit and the decreased intensity (relative to that observed in the spectra of the other groups) reflects structural differences in the diamine monomer units. The nature of the differences could not be determined from the spectra. The remaining bands near 3300, 1320, 1200, 910 and 700 cm$^{-1}$ are though to be affected by crystallinity of the sample films. Infrared absorption bands which are sensitive to changes in sample crystallinity normally become sharper and increase in peak height intensity as crystallinity increases. Based on this interpretation of the spectral differences among the various groups, the groups can be ordered according to crystallinity as follows: >2>1 4.

The Group 3 polyamides (most highly crystalline) are the relatively pure 5MND-T polyamide (II) and a polymer (IV) derived from alcohol precipitation of the salt, a method which, according to analysis of the salt, gives the greatest enrichment in 5-methyl-1,9-nonanediamine content. The Group 2 polyamide (second most crystalline) is derived from salt made from aqueous methanol, a method which was found to give some enrichment in 5-methyl-1,9-nonanediamine content. Group 1 consists of polymers made either directly from monomers (Polyamide VI) or derived from salt made from an ethanol slurry with almost no isomer enrichment. Group 4 is Polyamide XI which contains about 50 weight percent olefinically unsaturated diamine units.

Figure 2:
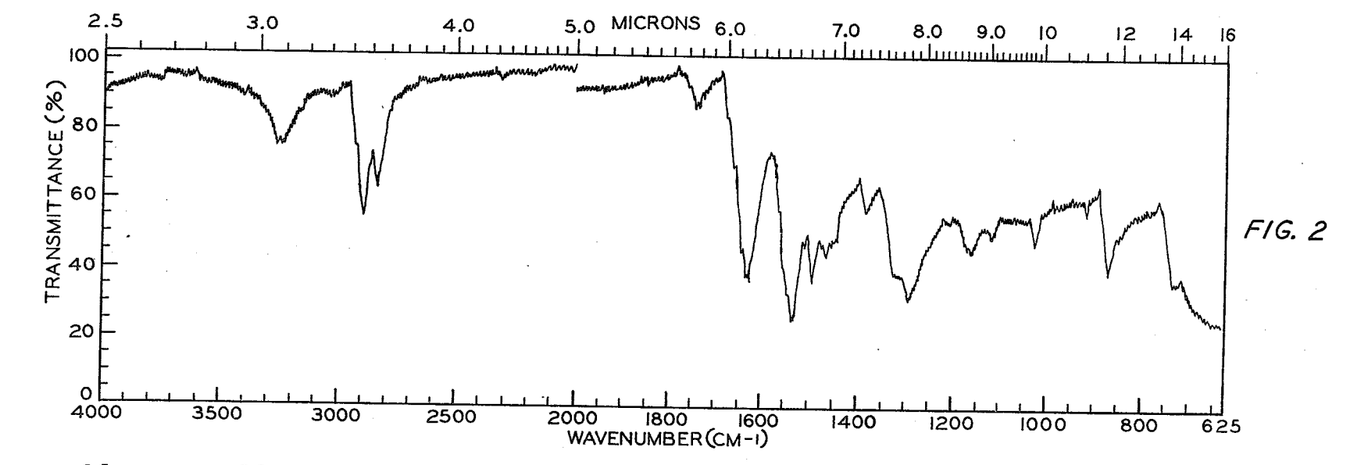

Infrared spectra of fiber samples for runs 1, 2, 3, 4, 5, 6, 15, 16 and 17 were obtained by multiple internal reflectance using a Wilks Model 12 internal reflectance unit and a Perkin-Elmer Model 257 spectrophotometer. Samples for infrared analysis were prepared by winding the fibers on a KRS-5 reflectance plate. These spectra are different from conventional infrared transmission spectra as they arise from absorption by the surface layers of the sample only. In addition variations in band intensities are expected for oriented polymer samples due to the polarization of the spectrometer beam by the optical components of the internal reflectance unit and the spectrometer. The infrared spectrum for the fiber of run 5, which is considered to be representative, is shown in FIG. 2 of the drawings.

With the exception of the presence of a band at 1735 cm$^{-1}$, the reflectance spectra of the fibers contain absorption bands characteristic of polyamides made from terephthalic acid and aliphatic $\alpha,\omega$-diamines and resemble the spectra of the polymers from which the fibers were spun. The spectra of the five fibers are essentially the same except for variations in the intensity of the 1735 cm$^{-1}$ band. The 1735 cm$^{-1}$ band is attributed to carbonyl groups other than amide carbonyl groups. A portion of sample for run 2 was melted and spread on a KBr disk under nitrogen and its transmission spectrum was recorded. The spectrum was similar to the transmission spectrum of the polymer from which the fiber was spun and the 1735 cm$^{-1}$ band was very weak. It is concluded that the 1735 cm$^{-1}$ band is due to C=O groups resulting from surface oxidation of the fiber.

Three of the fibers (runs 15, 16 and 17) were made from Polyamide XI and they show differences which may be due to the degree of orientation in each fiber. The ratio of the band intensities at 2960 cm$^{-1}$ to that at 3300 cm$^{-1}$ decreases from run 15 sample to run 16 sample to run 17 sample, presumably as the degree of orientation of the fiber decreases. The band intensity at 1460 cm$^{-1}$ also decreases from run 15 sample to run 16 sample to run 17 sample.

The spectrum of the fiber made from Polyamide II is similar to the spectrum of fiber of run 15 except for the ratio of the band intensities at 2960 cm$^{-1}$ to 3300 cm$^{-1}$ which ratio for Polyamide II is approximately the same as for the run 17 sample.

The infrared analysis and NMR analysis of these polymers and fibers of the present invention are consistent with the polymer being a linear polymer consisting essentially of recurring structural units of the formula wherein R is selected from the group consisting of 5-methylnonamethylene, 2,4-dimethyloctamethylene, and 2,4,6-trimethylheptamethylene, with at least 80 percent of the R's being 5-methylnonamethylene.

Analysis of the terephthalic acid used in the preceding examples showed 0.061 weight percent benzoic acid and 0.01 weight percent ash as impurities.

Reasonable variations and modifications are possible within the scope of the foregoing disclosure, the drawings and the appended claims to the invention.

We claim:

1. A fiber of a terephthalamide polymer with at least 80 weight percent of the polymer being composed of recurring structural units of the formula wherein the R in each of at least 50 percent of said recurring structural units is 5-methylnonamethylene, and the R in each of the balance, if any, of said recurring structural units is individually selected from the group consisting of 2,4-dimethyloctamethylene and 2,4,6-trimethylheptamethylene, said fiber having a boiling water shrinkage of less than 30 percent.

2. A fiber in accordance with claim 1 wherein said polymer contains less than 5 olefinic double bonds per 100 R groups.

3. A fiber in accordance with claim 1 wherein said fiber has less than 0.5 weight percent, based on the weight of the fiber, of plasticizers for said polymer.

4. A fiber in accordance with claim 1 wherein at least 90 weight percent of said polymer consists of said recurring structural units and wherein said fiber has infrared absorption bands near 3300, 3080, 2930, 2880, 1630, 1550, 1500, 1300, 1020, 870, and 740 cm$^{-1}$.

5. A fiber in accordance with claim 1 wherein said polymer has an inherent viscosity of at least about 0.6 as measured at 30°C in a m-cresol solution having a polymer concentration of 0.5 gram/100 milliliters solution; and wherein said polymer has a polymer melt temperature of at least about 220°C, a $T_g$ in the range of about 100°C to about 120°C, and a $T_m$ in the range of about 247°C to about 265°C.

6. A fiber in accordance with claim 1 wherein said fiber has a zero strength temperature of at least about 200°C.

7. A fiber in accordance with claim 1 wherein said polymer has a nuclear magnetic resonance spectrum corresponding to FIG. 4 of the attached drawings.

8. A fiber in accordance with claim 1 wherein said polymer is a linear polymer consisting essentially of said recurring structural units.

9. A fiber in accordance with claim 8 wherein at least 80 percent of the R's are 5-methylnonamethylene.

10. A fiber in accordance with claim 9 wherein said fiber has a boiling water shrinkage of less than 20 percent.

11. A fiber in accordance with claim 10 wherein said fiber has a zero strength temperature of at least 210°C.

12. A fiber in accordance with claim 11 wherein said polymer has an inherent viscosity of at least 0.7 as measured at 30°C in a m-cresol solution having a polymer concentration of 0.5 gram/100 milliliters solution.

13. A fiber in accordance with claim 12 wherein said fiber is essentially free of any plasticizer for said polymer.

14. A fiber in accordance with claim 12 wherein said polymer contains less than 1 olefinic double bond per 1000 R groups.

15. A fiber in accordance with claim 14 wherein said fiber has infrared absorption bands near 3300, 3080, 2930, 2880, 1630, 1550, 1500, 1300, 1020, 870, and 740 cm$^{-1}$.

16. A fiber in accordance with claim 15 wherein said polymer has a $T_g$ in the range of about 105°C to about 115°C, a $T_m$ in the range of about 250°C to about 260°C, and a polymer melt temperature in the range of about 225°C to about 260°C.

17. A fiber in accordance with claim 14 wherein said polymer has an infrared spectrum essentially as illustrated in FIG. 1 of the attached drawings.

18. A fiber in accordance with claim 1 which has been annealed.

19. A fiber in accordance with claim 1 which has been drawn to at least three times its original length.

20. A fiber in accordance with claim 1 wherein the R in some of said recurring structural units is 2,4-dimethyloctamethylene, and wherein the R in other ones of said recurring structural units is 2,4,6-trimethylheptamethylene.

21. A fiber in accordance with claim 8 wherein the R in some of said recurring structural units is 2,4-dimethyloctamethylene, and wherein the R in other ones of said recurring structural units is 2,4,6-trimethylheptamethylene.

22. A terephthalamide polymer with at least 80 weight percent thereof being composed of recurring structural units of the formula wherein the R in each of at least 50 percent of said recurring structural units is 5-methylnonamethylene, and the R in each of the balance, if any, of said recurring structural units is individually selected from the group consisting of 2,4-dimethyloctamethylene and 2,4,6-trimethylheptamethylene, said polymer containing less than 5 olefinic double bonds per 100 R groups, said polymer being a linear polymer having an inherent viscosity of at least about 0.6 as measured at 30°C in a m-cresol solution having a polymer concentration of 0.5 gram/100 milliliters solution; said polymer having a polymer melt temperature of at least about 200°C, a $T_g$ in the range of about 100°C to about 120°C, and a $T_m$ in the range of about 247°C to about 265°C.

23. A linear terephthalamide polymer consisting essentially of recurring structural units of the formula wherein the R in each of at least 80 percent of said recurring structural units is 5-methylnonamethylene, and the R in each of the balance, if any, of said recurring structural units is individually selected from the group consisting of 2,4-dimethyloctamethylene and 2,4,6-trimethylheptamethylene, said polymer containing less than 5 olefinic double bonds per 100 R groups, said polymer having an inherent viscosity of at least 0.7 as measured at 30°C in a m-cresol solution having a polymer concentration of 0.5 gram/100 milliliters solution.

24. A linear terephthalamide polymer consisting essentially of recurring structural units of the formula wherein the R in each of at least 80 percent of said recurring structural units is 5-methylnonamethylene, and the R in each of the balance, if any, of said recurring structural units is individually selected from the group consisting of 2,4-dimethyloctamethylene and 2,4,6-trimethylheptamethylene, said polymer containing less than 1 olefinic double bond per 100 R groups, said polymer being essentially free of any plasticizer for said polymer, said polymer having a $T_g$ in the range of about 105°C to about 115°C, a $T_m$ in the range of about 250°C to about 260°C, and a polymer melt temperature in the range of about 225°C to about 260°C.

25. A polymer in accordance with claim 24 wherein said polymer has an infrared spectrum essentially as illustrated in FIG. 1 of the attached drawings, and a nuclear magnetic resonance spectrum essentially as illustrated in FIG. 4 of the attached drawings.

26. A terephthalamide polymer with at least 80 weight percent thereof being composed of recurring structural units of the formula wherein the R in each of at least 50 percent of said recurring structural units is 5-methylnonamethylene, the R in some of the remainder of said recurring structural units is 2,4-dimethyloctamethylene, and the R in the balance of said recurring structural units is 2,4,6-trimethylheptamethylene, said polymer containing less than 5 olefinic double bonds per 100 R groups.

27. A polymer in accordance with claim 26 wherein said polymer is a linear polymer consisting essentially of said recurring structural units.

* * * * *